Figure 1:
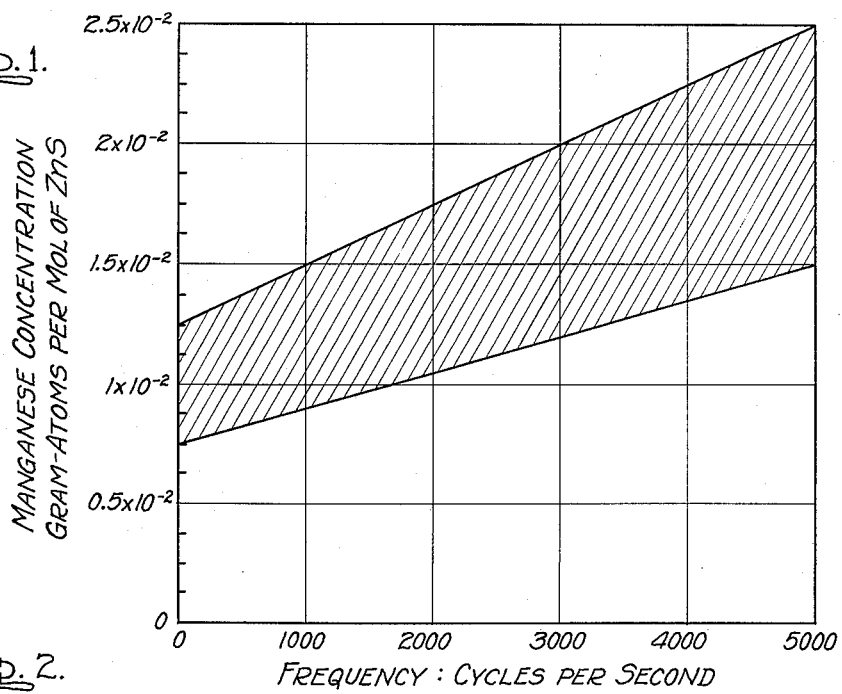

March 13, 1962   M. AVEN   3,025,244
WHITE AIR-FIRED ELECTROLUMINESCENT PHOSPHOR
Filed Dec. 2, 1959

Inventor:
Manuel Aven
by Ernest W. Legree
His Attorney

3,025,244
WHITE AIR-FIRED ELECTROLUMINESCENT PHOSPHOR
Manuel Aven, Ballston Lake, N.Y., assignor to General Electric Company, a corporation of New York
Filed Dec. 2, 1959, Ser. No. 856,828
5 Claims. (Cl. 252—301.6)

This invention relates to luminescent materials or phosphors and more particularly to an electroluminescent zinc sulfide type phosphor providing white light under electric field excitation.

Electroluminescent phosphors may be used in electroluminescent lamps or cells wherein a thin layer of phosphor which may be dispersed in a suitable dielectric medium is sandwiched between a pair of conducting plates at least one of which is transparent. The lamp is in the nature of a luminous capacitor and when an alternating voltage is applied across the plates, the phosphor emits visible light which escapes through the transparent plate.

It is well-known that zinc sulfide phosphors can be made with electroluminescent emission in the blue, in the green, in the yellow, and in the orange through emission peaks occurring at about 4600, 5200, 5850 and 6800 A. respectively. In many of the applications for electroluminescent lamps, white light is preferable to colored light. It is possible to combine the known colored electroluminescent phosphors in various proportions and thereby obtain white emitting mixtures with reasonably good appearance. For example, an electroluminescent phosphor may be prepared by mixing blue, green, and yellow emitting phosphors in proportions of approximately 25:5:70, and electroluminescent lamps using this phosphor blend give a light which appears white to the eye. Unfortunately, however, the three components tend to depreciate at different rates during life as a result of which the electroluminescent lamps change color with use; this one particular blend shows a tendency to turn pink. A single component white electroluminescent phosphor, and particularly one which is relatively easy to prepare and which is stable in color during life would obviously be much preferable.

Accordingly the general object of the invention is to provide a single component electroluminescent phosphor giving a light emission which appears white to the eye.

More specific objects of the invention are to provide such a phosphor having relatively good brightness and maintenance and which remains stable in color throughout life, and to provide a convenient air-firing method for preparing such a phosphor.

In accordance with the invention, I provide a single component white electroluminescent phosphor of the zinc sulfide type combining in suitable proportions high copper blue emitting centers (believed to result from two atoms of chlorine-coactivated substitutional copper), low copper green emitting centers (believed to result from one atom of chlorine-coactivated substitutional copper), and yellow emitting centers resulting from one atom of substitutional manganese. The phosphor is prepared by prefiring the basic mixture of zinc sulfide and zinc oxide with manganese at a high temperature in a neutral atmosphere and then refiring with added copper and chlorine at a low temperature in air. The phosphors prepared in accordance with the invention provide a light which appears white to the eye, which is at least equal in brightness to that obtained from multiple component phosphor mixtures, and which remains constant in color even after substantial depreciation.

Figure 2:
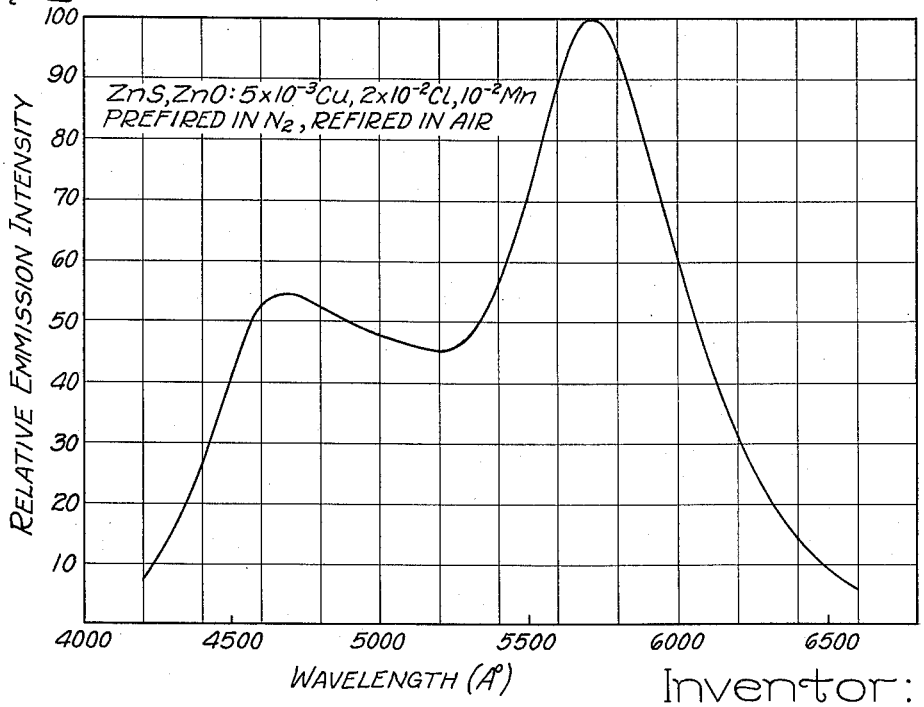

In the drawings:
FIG. 1 illustrates graphically the manganese concentration to frequency relationship in phosphors according to the invention.
FIG. 2 illustrates a typical spectral response curve of a phosphor according to the invention.

A typical phosphor in accordance with the invention may be prepared as follows: a mixture of zinc sulfide with a minor proportion of zinc oxide, for instance 10 to 40% zinc oxide is used. A preferred mixture consists of 75% by weight zinc sulfide and 25% zinc oxide. The mixture is wetted down with a solution of a manganese salt, for instance manganese nitrate, to give about 1 atom percent of manganese per mol of zinc sulfide where the phosphor is to be used at low frequencies, and about 2 atoms percent of manganese per mol of zinc sulfide where the phosphor is to be used at high frequencies. The concentration of manganese is quite critical and will be discussed more fully hereinafter. The slurry is dried at a low temperature, and then prefired for about one hour at a temperature above the hexagonal-cubic transition point and in the range of 1150° C. to 1250° C. in a stagnant nitrogen atmosphere. The duration of the prefiring time is not critical and will of course be longer with large batches of material.

The material is then cooled to room temperature and copper and chlorine added as activator and coactivator. The copper may be added in the form of a copper salt such as copper nitrate to give from 0.1 to 1.0 atom percent copper, preferably about 0.5 atom percent copper in the prefired material. Chlorine may be added in the form of ammonium chloride $NH_4Cl$ or zinc chloride $ZnCl_2$ solution, to give between 1 and 3 atom percent, preferably approximately 2 atom percent, chlorine in the prefired material. After drying again, the prefired material is refired at a temperature below the hexagonal-cubic transition point and in the range of 850 to 950° C., preferably at approximately 900° C. The refiring is done by placing the mixture in the inner one of a pair of close fitting silica tubes, the inner tube being inserted open end foremost within the outer. This allows any gases to be expelled and prevents air from diffusing back and causing excessive oxidation of the zinc sulfide. The duration of the refiring time is not critical provided it be long enough to allow substantial transformation from hexagonal to cubic form and diffusion of the activator and coactivator into the phosphor crystallites; a period of approximately 16 hours is adequate.

After cooling, the refired material is washed in the usual fashion in dilute acid and in dilute cyanide solution. For instance, it may be washed in acetic acid to remove free zinc oxide and then in potassium cyanide to remove superficial copper compounds. It is then rinsed thoroughly with the ionized water and dried at a low temperature, for instance about 110° C.

The concentration of manganese in the phosphor is quite critical. If manganese is omitted entirely, a bluish-green emitting phosphor is obtained. Adding increasing amounts of manganese up to about 5 atom percent per mol of zinc sulfide (not combined zinc sulfide and zinc oxide) produces a gradual shift through various shades of white to yellow. A given percentage of manganese will result in white emission at one frequency only. For a given concentration of manganese resulting in white light at a given frequency, a shift to lower operating frequencies results in a color shift to yellow, and a shift to higher operating frequencies results in a color shift to blue. It is, however, possible to produce a white emitting phosphor for operation at any given frequency by reducing the concentration of manganese for low frequency operation and increasing it for high frequency operation.

In general, a manganese concentration of about 1 atom percent per mole of zinc sulfide will result in white light at low operating frequencies, that is frequencies in the nature of 60 cycles per second, and a manganese concentration of about 2 atom percent per mol of zinc sulfide results in white light at high operating frequencies of about 5000 cycles per second. These figures are of course approximate and the exact concentration of manganese may vary with details of the firing procedure and proportions and total quantities of materials but it will in general be between the limits of 0.75 to 1.25 mol percent at the low frequency end of the range, and between 1.5 and 2.5 percent at the high frequency end. As for the inbetween frequencies, since the designation "white" is, at least to a certain degree, subjective and admits of qualifications as "warm," or "cool," or daylight, a linear interpolation between 60 cycles per second and 5000 cycles per second and the corresponding concentrations of manganese provides an adequate approximation for the required manganese concentration to give white. To put it differently, starting with 1.0 atom percent Mn for 60 cycles per second, an increment in manganese of 0.2 atom percent should be added for each increment of 1000 cycles per second in frequency in order to provide white emission. This relationship is depicted in the graph of FIG. 1 wherein the shaded band, representing a tolerance or spread of about ±25%, shows the manganese concentration wherein white light will be found for operating frequencies up to 5000 cycles per second.

Two specific examples of suitable phosphor preparations in accordance with the invention are as follows:

*Example I.—60 Cycle Operation*

A mixture of 75% by weight zinc sulfide and 25% by weight zinc oxide is wetted down with a solution of manganese nitrate to give 1 atom percent of manganese per mol of zinc sulfide. The slurry is dried at about 110° C. and then prefired for one hour at 1200° C. in a stagnant nitrogen atmosphere. After the prefiring, 1 mol percent of $ZnCl_2$ (corresponding to 2 atom percent chlorine), and 0.5 mol percent $Cu(No_3)_2$ (corresponding to 0.5 atom percent copper) are added to the prefired material in the form of aqueous solutions and the slurry is again dried at 110° C. The dry material is then placed in the inner one of two telescoping silica tubes as previously described and refired for 16 hours at 900° C. in air. The phosphor is then washed with acetic acid and sodium cyanide, rinsed thoroughly with deionized water, and then dried at 110° C.

Under electroluminescent excitation at 60 cycles per second, the phosphor gives a response which appears white to the eye. FIG. 2 shows the spectral response curve of the phosphor obtained by applying 300 volts at 60 cycles to a 5 mil thick dispersion of the phosphor in dry chlorinated biphenyl (Aroclor, described in publication O-P 115 of Monsanto Chemical Company).

*Example II.—5000 Cycle Operation*

Identical in composition and preparation to Example I except that the manganese concentration is increased to 2 atom percent of manganese per mol of zinc sulfide ($2 \times 10^{-2}$ gram atoms Mn/mol ZnS).

The phosphor when tested at about 30,000 volt per centimeter (120 volts across a 1.5 mil thick dispersion in dry chlorinated biphenyl) and 5000 cycles per second has an emission which looks white to the eye.

The specific examples of embodiments of the invention given herein are intended as illustrative and not as limitative of the invention whose scope is to be determined by the appended claims.

What I claim as new and desire to secure by Letters Patent of the United States is:

1. A single component zinc sulfide-zinc oxide electroluminescent phosphor activated by manganese, copper, and chlorine and characterized by white emission at a selected frequency of excitation up to 5,000 cycles per second and constancy of color during life induced by prefiring at a temperature in the range of 1150 to 1250° C. a mixture of ZnS and 10 to 40% ZnO by weight and including a manganese salt in a proportion to give an atom concentration of Mn per mole of ZnS falling within the shaded band of FIG. 1 at the selected frequency, cooling the prefired material and adding copper and chloride salts to provide 0.1 to 1.0 atom percent Cu and 1 to 3 atom percent Cl per mole of ZnS respectively, and refiring at a temperature in the range of 850 to 950° C. for a length of time sufficient to assure substantial transformation from hexagonal to cubic phase in the refired material.

2. The method of preparing a single component electroluminescent phosphor having a white emission at a selected frequency of excitation up to 5,000 cycles per second and constancy of color during life which comprises prefiring at a temperature in the range of 1150 to 1250° C. a mixture of ZnS and 10 to 40% ZnO by weight along with a manganese salt in a proportion to give an atom concentration of manganese per mole of zinc sulfide falling within the shaded band of FIG. 1 at the selected frequency, cooling the prefired material and adding copper and chloride salts to provide 0.1 to 1.0 atom percent of Cu and 1 to 3 atom percent of Cl per mole of ZnS, and refiring at a temperature in the range of 850 to 950° C. in air for a length of time sufficient to assure substantial transformation from hexagonal to cubic phase in the refired material, and diffusion of activators and coactivators into the phosphor crystallites.

3. The method of preparing a single component electroluminescent phosphor characterized by white emission at frequencies of about 60 cycles per second and constancy of color during life which comprises prefiring at a temperature in the range of 1150 to 1250° C. a mixture of ZnS and 10 to 40% ZnO by weight and including a manganese salt in a proportion to give from 0.75 to 1.25 atom percent of manganese per mol of zinc sulfide, cooling the prefired material and adding copper and chloride salts to provide 0.1 to 1.0 atom percent copper and 1 to 3 atom percent chlorine per mol of zinc sulfide respectively, and refiring at a temperature in the range of 850 to 950° C. in air for a length of time sufficient to assure substantial transformation from hexagonal to cubic phase in the refired material and diffusion of activators and coactivators into the phosphor crystallites.

4. The method of preparing a single component electroluminescent phosphor characterized by white emission at frequencies of about 5000 cycles per second and constancy of color during life which comprises prefiring at a temperature in the range of 1150 to 1250° C. a mixture of ZnS and 10 to 40% ZnO by weight and including a manganese salt in a proportion to give from 1.5 to 2.5 atom percent manganese per mol of zinc sulfide, cooling the prefired material and adding copper and chloride salts to provide 0.1 to 1.0 atom percent copper and 1 to 3 atom percent chlorine per mole of zinc sulfide respectively, and refiring at a temperature in the range of 850 to 950° C. in air for a length of time sufficient to assure substantial transformation from hexagonal to cubic phase in the refired material and diffusion of activators and coactivators into the phosphor crystallites.

5. The method of preparing a single component electroluminescent phosphor characterized by white emission at frequencies of about 60 cycles per second and constancy of color during life which comprises prefiring at a temperature of about 1200° C. a mixture of ZnS and about 25% ZnO by weight and including manganese nitrate in a proportion to give about 1 atom percent manganese per mol of zinc sulfide, cooling the prefired material and adding copper nitrate and zinc chloride to provide about 0.5 atom percent copper and about 2 atom percent chlorine per mol of zinc sulfide respectively, and refiring at a temperature in the range of about 900° C. for a length of time sufficient to assure substantial transformation from hexagonal to cubic phase in the refired material and diffusion of activators and coactivators into the phosphor crystallites.

References Cited in the file of this patent
UNITED STATES PATENTS

| | | |
|---|---|---|
| 2,743,238 | Hunt et al. | Apr. 24, 1956 |
| 2,782,168 | Fetters | Feb. 19, 1957 |
| 2,821,509 | Hunt et al. | Jan. 28, 1958 |